(12) United States Patent
Nakano et al.

(10) Patent No.: US 9,285,918 B2
(45) Date of Patent: Mar. 15, 2016

(54) INFORMATION PROCESSING APPARATUS INCLUDING TOUCH PANEL FOR DETECTING USER OPERATION

(71) Applicant: FUJITSU LIMITED, Kawasaki-shi, Kanagawa (JP)

(72) Inventors: Katsue Nakano, Tama (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 14/135,761

(22) Filed: Dec. 20, 2013

(65) Prior Publication Data

US 2014/0292726 A1  Oct. 2, 2014

(30) Foreign Application Priority Data

Mar. 28, 2013  (JP) .................. 2013-070486

(51) Int. Cl.
   *G06F 3/041* (2006.01)
   *G06F 3/0488* (2013.01)
(52) U.S. Cl.
   CPC ............ *G06F 3/0418* (2013.01); *G06F 3/0488* (2013.01)
(58) Field of Classification Search
   CPC .......................... G06F 3/04845; G06F 3/0485
   See application file for complete search history.

(56) References Cited

U.S. PATENT DOCUMENTS

2012/0069231 A1   3/2012  Chao
2013/0057587 A1*  3/2013  Leonard et al. ............... 345/660
2013/0201160 A1*  8/2013  Ito et al. ......................... 345/178
2013/0207935 A1   8/2013  Toda et al.
2014/0160054 A1*  6/2014  Rabii et al. .................... 345/174

FOREIGN PATENT DOCUMENTS

| JP | 2008-112334 | 5/2008 |
| JP | 2010-129026 | 6/2010 |
| JP | 2012-88899  | 5/2012 |
| JP | 2012-138026 | 7/2012 |

OTHER PUBLICATIONS

EESR—The Extended European Search Report dated Sep. 24, 2014 issued in the corresponding European application No. 13199114.3.
EPOA—Office Action dated Jan. 18, 2016 issued in the corresponding European Patent Application No. 13199114.3. US2012/069231A1 cited in the EPOA was previously submitted in the IDS filed on Nov. 24, 2014, and considered by the Examiner on Jul. 24, 2015.

* cited by examiner

*Primary Examiner* — Nalini Mummalaneni
(74) *Attorney, Agent, or Firm* — Fujitsu Patent Center

(57) ABSTRACT

An information processing apparatus including a processor, a touch panel, and a display, wherein the processor moves a part or all of a display screen by a predetermined vector and displays the part or all of the display screen on the display when a touch on the touch panel is detected, determines whether or not there are touches that follow the movement of the part or all of the display screen before and after the movement when a touch on the touch panel is detected after the movement, and detects the touches that follow the movement of the part or all of the display screen to be of a user operation, and does not detect touches that do not follow the movement of the part or all of the display screen.

3 Claims, 7 Drawing Sheets

FIG.4

LIST OF TOUCH COORDINATES 1

| TOUCH NUMBER | TOUCH COORDINATE |
|---|---|
| 1 | X1, Y1 |
| 2 | X2, Y2 |
| 3 | X3, Y3 |
| 4 | X4, Y4 |

LIST OF TOUCH COORDINATES 2

| TOUCH NUMBER | TOUCH COORDINATE |
|---|---|
| 1 | X1, Y1 |
| 2 | X2, Y2 |
| 3 | Xa, Yb |
| 4 | X4, Y4 |

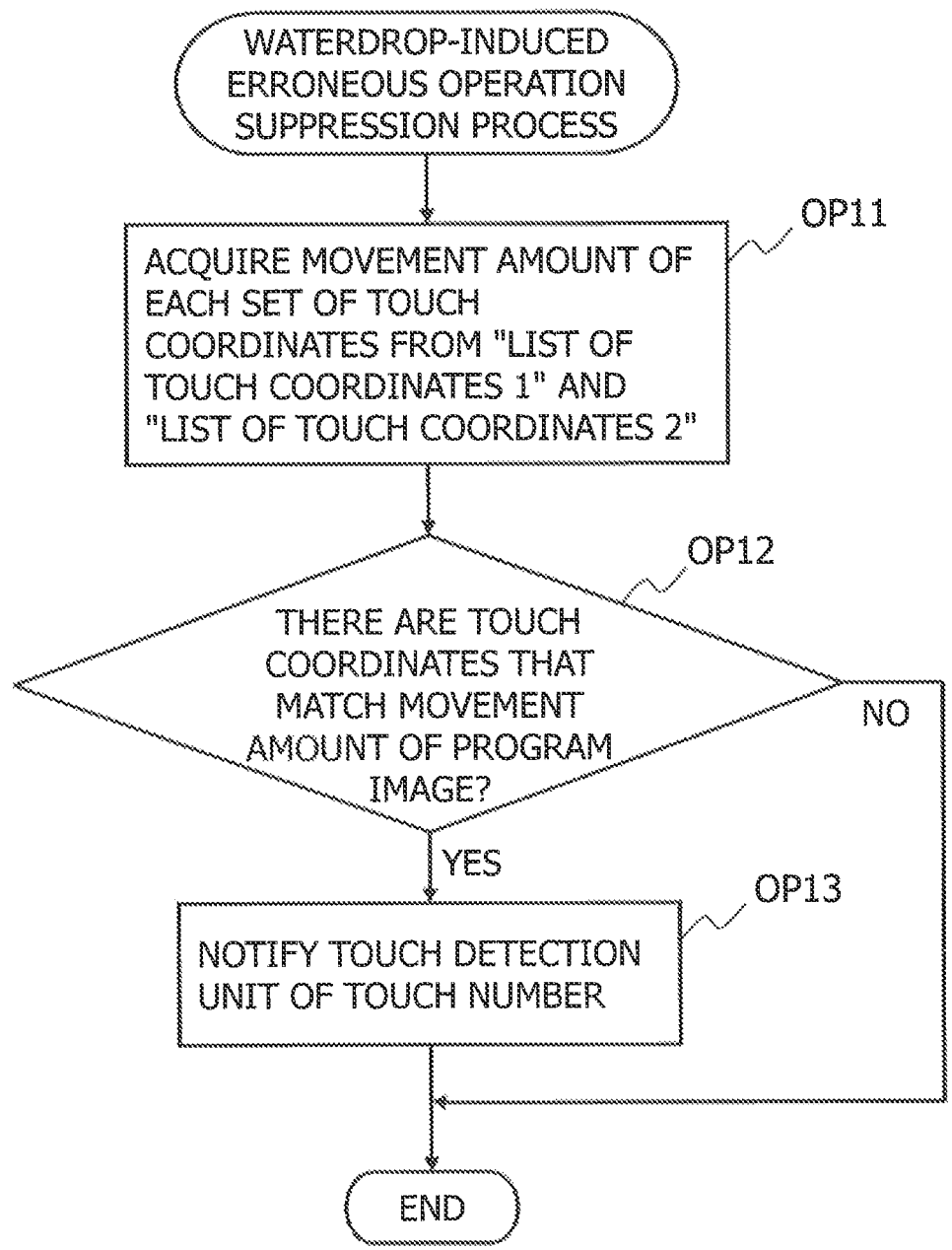

INFORMATION PROCESSING APPARATUS INCLUDING TOUCH PANEL FOR DETECTING USER OPERATION

CROSS-REFERENCE TO RELATED APPLICATION

This application is based upon and claims the benefit of priority of the prior Japanese Patent Application No. 2013-070486, filed on Mar. 28, 2013, the entire contents of which are incorporated herein by reference.

FIELD

The present invention relates to an information processing apparatus, an information processing method, and an information processing program.

BACKGROUND

Some of the smartphones, portable tablet terminals and the like provided with a touch panel are processed to be waterproof. Waterproofed smartphones and portable tablet terminals may be used in the bathroom, for example. For example, in the case of a capacitive touch panel, an electric field is formed on the surface of the touch panel, and a position is detected by detecting a change in the charge.

PATENT DOCUMENT

[Patent document 1] Japanese Patent Laid-Open No. 2012-138026
[Patent document 2] Japanese Patent Laid-Open No. 2012-88899
[Patent document 3] Japanese Patent Laid-Open No. 2010-129026
[Patent document 4] Japanese Patent Laid-Open No. 2008-112334

However, for example, in the case where the touch panel is of a capacitive type, when a waterdrop is attached to the touch panel, the charge at the position may change, and the position may be erroneously detected as a touch operation of a user. Due to this attached waterdrop being erroneously detected as a touch operation, the user is sometimes prevented from appropriately operating the smartphone or the portable tablet terminal. Also, for example, when a waterdrop drips down the touch panel, the touch operation of the user may become unstable and may result in an erroneous operation regarding screen operation.

SUMMARY

An aspect of the present invention is
an information processing apparatus including a processor, a touch panel, and a display,
wherein the processor
moves a part or all of a display screen by a predetermined vector and displays the part or all of the display screen on the display when a touch on the touch panel is detected,
determines whether or not there are touches that follow the movement of the part or all of the display screen before and after the movement when a touch on the touch panel is detected after the movement, and
detects the touches that follow the movement of the part or all of the display screen to be of a user operation, and does not detect touches that do not follow the movement of the part or all of the display screen.

Another aspect of the present invention is an information processing method of an information processing apparatus for performing the processes described above. Also, another aspect of the present invention may include an information processing program for causing a computer to function as the information processing apparatus described above, and a computer-readable recording medium recording the program. The recording medium that can be read by a computer and the like is a recording medium that can store information of data, programs and the like by means of electrical, magnetic, optical, mechanical or chemical effects, and that can be read by a computer and the like.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a list of touch coordinates;
FIG. 6 is an example of a flow chart of a waterdrop-induced erroneous operation suppression process.

DESCRIPTION OF EMBODIMENTS

In the following, an embodiment of the present invention will be described with reference to the drawings. The configuration of the embodiment below is an example, and the present invention is not restricted to the configuration of the embodiment.

<First Embodiment>

Figure 1A:
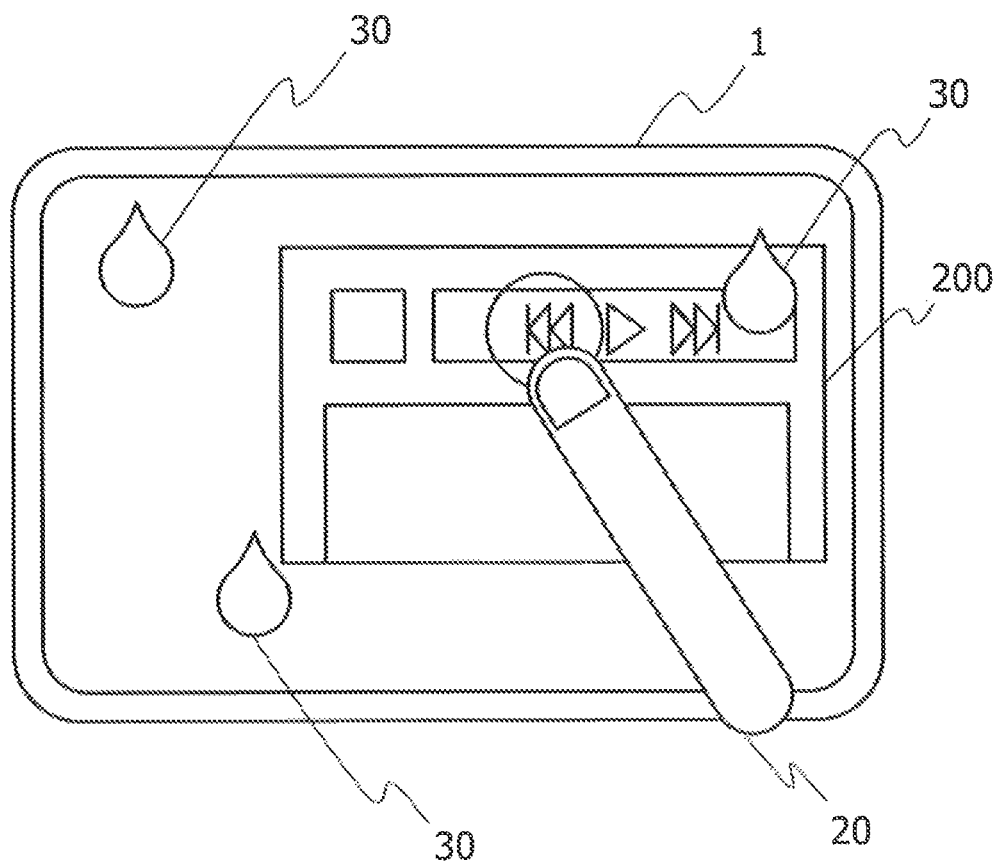
FIG. 1A is a diagram illustrating an example operation of a portable tablet terminal according to a first embodiment.
Figure 1B:
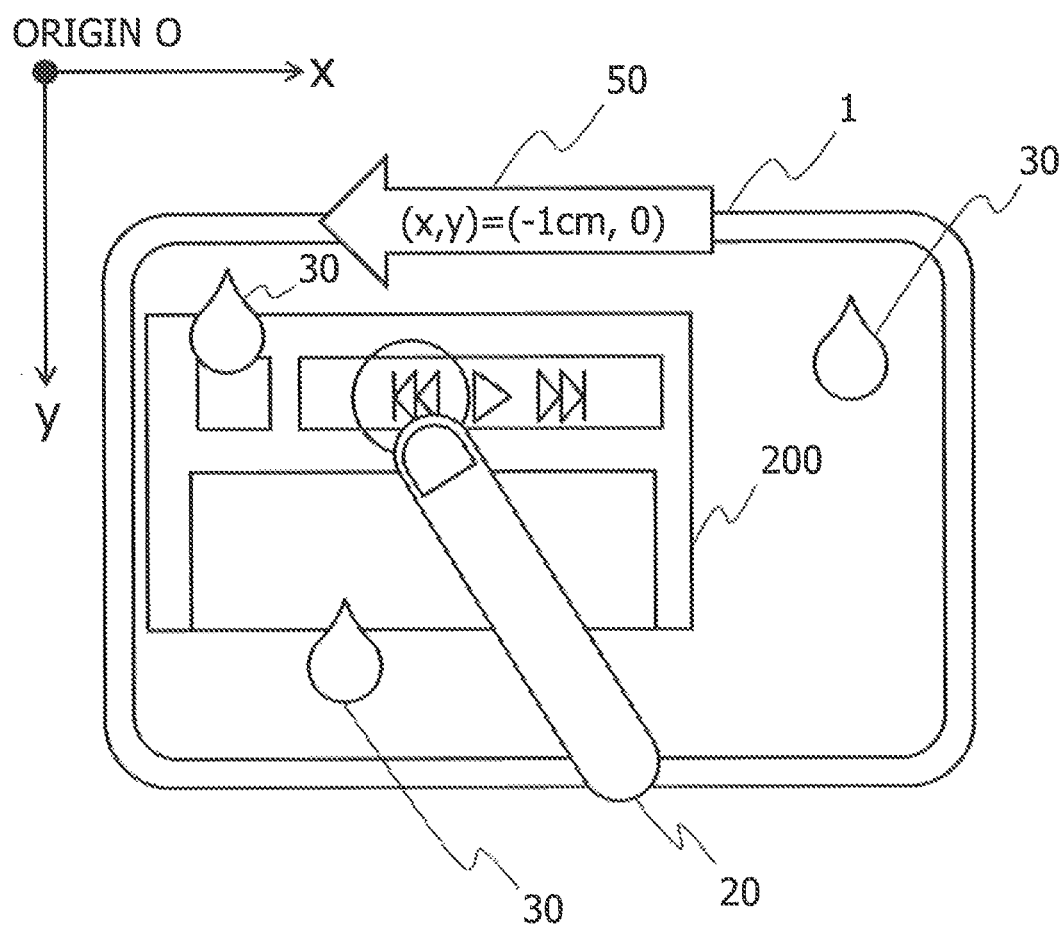
FIG. 1B is a diagram illustrating an example operation of the portable tablet terminal according to the first embodiment.

FIGS. 1A and 1B are diagrams illustrating example operations of a portable tablet terminal 1 according to a first embodiment. In FIGS. 1A and 1B, the portable tablet terminal 1 includes a capacitive touch panel, and is processed to be waterproof.

FIG. 1A illustrates an example of a case where a user has touched the touch panel of the portable tablet terminal 1. At this time, in addition to a finger 20 of the user, a plurality of waterdrops 30 are also attached to the portable tablet terminal 1.

In the first embodiment, in a case where a contact (touch) of a user's finger, a waterdrop or the like on a touch panel is detected, the portable tablet terminal 1 moves an active program image 200, which is estimated to be the operation target of the user, in a predetermined direction by a predetermined distance. The active program image 200 is, for example, a window screen displaying a program currently being executed and is a window image which has received the last user operation.

FIG. 1B is a diagram illustrating an example of the portable tablet terminal 1 where the active program image 200 has been moved in a predetermined direction by a predetermined distance. In the case where the active program image 200 has been moved, if the user wishes to input an operation on the program image 200, the finger 20 of the user makes a movement of following the movement of the program image 200. On the other hand, the waterdrops 30 stay at the attached positions, or flow on the touch panel in the vertical downward direction by gravity, and thus, do not move in such a way as to follow the movement of the program image 200. Accordingly, the program image 200 moves in a horizontal direction with respect to the predetermined direction and by 1 cm with respect to the predetermined distance, for example. The movement of the program image 200 may be indicated by a vector 50, for example. In FIG. 1B, in the case where the vertex at the top left, when facing the drawing, of the touch panel is taken as the origin, and the rightward horizontal direction and the downward vertical direction, when facing the drawing, are taken as +X direction and a +Y direction, respectively, the vector 50 indicating the movement direction and the movement amount of the program image 200 is expressed as (x, y)=(−1 cm, 0). When expressed as the movement amount of the program screen, this movement amount refers to a vector quantity including a predetermined direction and a predetermined movement distance (a scalar quantity).

Accordingly, according to the first embodiment, the portable tablet terminal 1 detects a touch that follows the movement of the program image 200 as a touch operation of the user, and does not detect a touch that does not follow, and thus, eliminates the touch positions of waterdrops attached to the touch panel. The portable tablet terminal 1 thereby suppresses an erroneous operation due to attachment of waterdrops.

Figure 2:
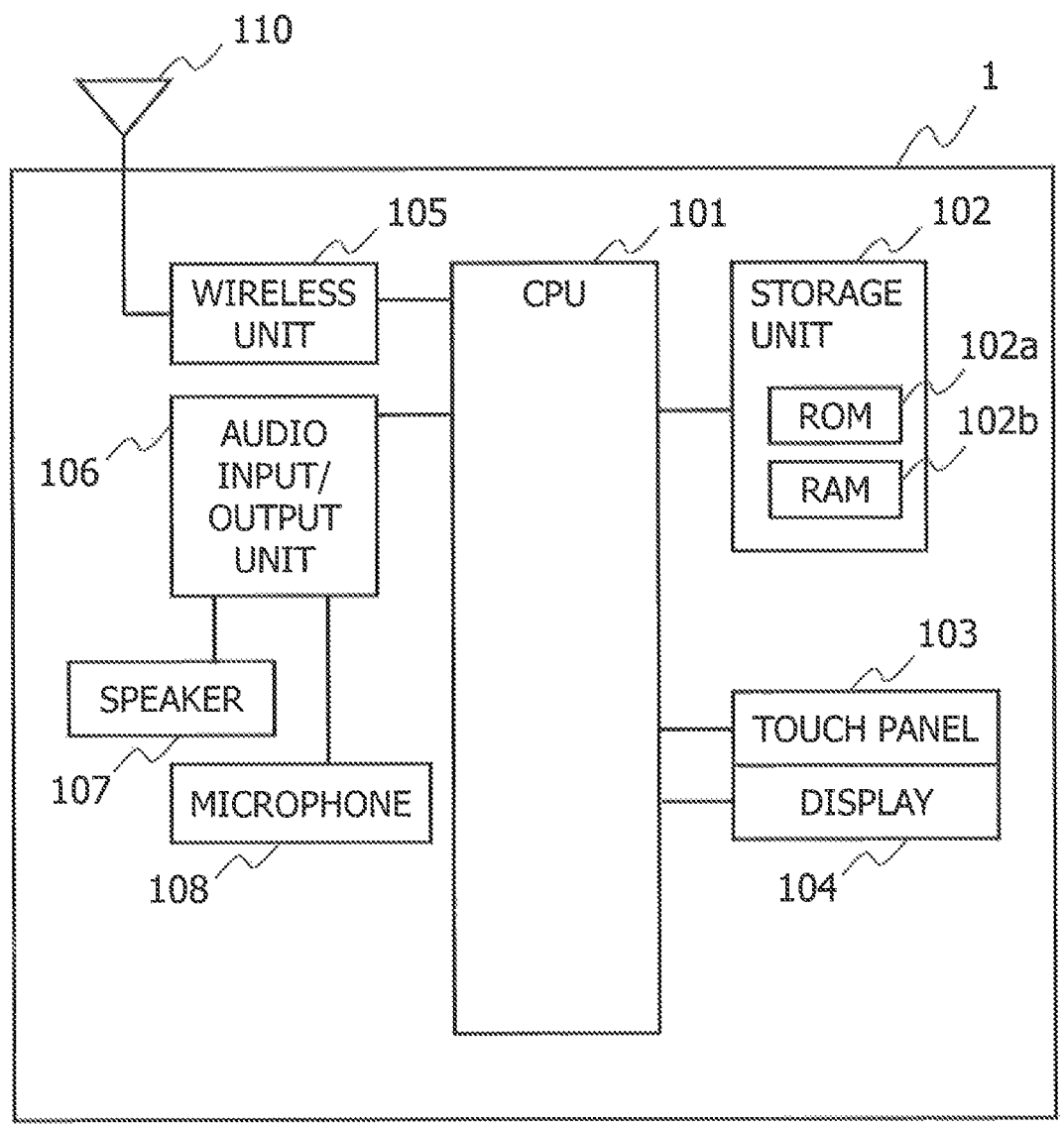
FIG. 2 is a diagram illustrating an example hardware configuration of the portable tablet terminal.

FIG. 2 is a diagram illustrating an example hardware configuration of the portable tablet terminal 1. The portable tablet terminal 1 includes a CPU (Central Processing Unit) 101, a storage unit 102, a touch panel 103, a display 104, a wireless unit 105, an audio input/output unit 106, a speaker 107, a microphone 108, and an antenna 110.

The storage unit 102 includes a ROM (Read Only Memory) 102A, and a RAM (Random Access Memory) 102B. The RAM 102B includes one that is volatile and one that is non-volatile. A user touch detection program is stored in the ROM 102A. The user touch detection program is a program for moving, in the case where a touch on the touch panel 103 is detected, an active program image by a predetermined vector, and for detecting a touch that follows the movement as a touch operation of a user. The user touch detection program may be alternatively stored in the non-volatile RAM 102B. Additionally, programs of the OS (Operating System) and the like are also stored in the ROM 102A or the non-volatile RAM 102B.

The touch panel 103 is one of position input devices, and is arranged on the surface of the display 104, and inputs coordinates of a touch position of a finger on the screen of the display 104. The coordinates of the touch position on the touch panel 103 will be hereinafter referred to as touch coordinates. In the first embodiment, the touch panel 103 is of a capacitive type. However, this is not restrictive. For example, if there is a possibility of detecting an attached position of a waterdrop, the touch panel 103 may be of a resistive type, a surface acoustic wave type, an infrared type, an electromagnetic induction type, or the like.

The display 104 is a liquid crystal display (LDC), for example. The display 104 displays screen data according to a signal input from the CPU 101.

The wireless unit 105 is connected to the antenna 110, and converts a wireless signal received via the antenna 110 into an electrical signal and outputs the same to the CPU 101, or converts an electrical signal input from the CPU 101 into a wireless signal and transmits the same via the antenna 110. The wireless unit 105 is an electronic circuit according to one or more of a third generation mobile communication system, a second generation mobile communication system, and an LTE (Long Term Evolution), for example.

The audio input/output unit 106 is connected to the speaker 107 as an audio output device, and the microphone 108 as an audio input device. The audio input/output unit 106 converts an audio signal input from the microphone 108 into an electrical signal and outputs the same to the CPU 101, or converts an electrical signal input from the CPU 101 into an audio signal and outputs the same to the speaker 107.

Additionally, the hardware configuration of the portable tablet terminal 1 is not restricted to the one illustrated in FIG. 2, and a change such as addition, replacement, deletion or the like may be made as appropriate. For example, in addition to the configuration illustrated in FIG. 2, the portable tablet terminal 1 may also include an infrared communication unit, an IC card communication unit or the like. The portable tablet terminal 1 is an example of an "information processing apparatus" in the aspect. In addition to the portable tablet terminal, examples of the "information processing apparatus" include portable information processing apparatuses provided with a touch panel such as a smartphone, a mobile phone terminal provided with a touch panel, a game terminal provided with a touch panel, and the like.

Figure 3:
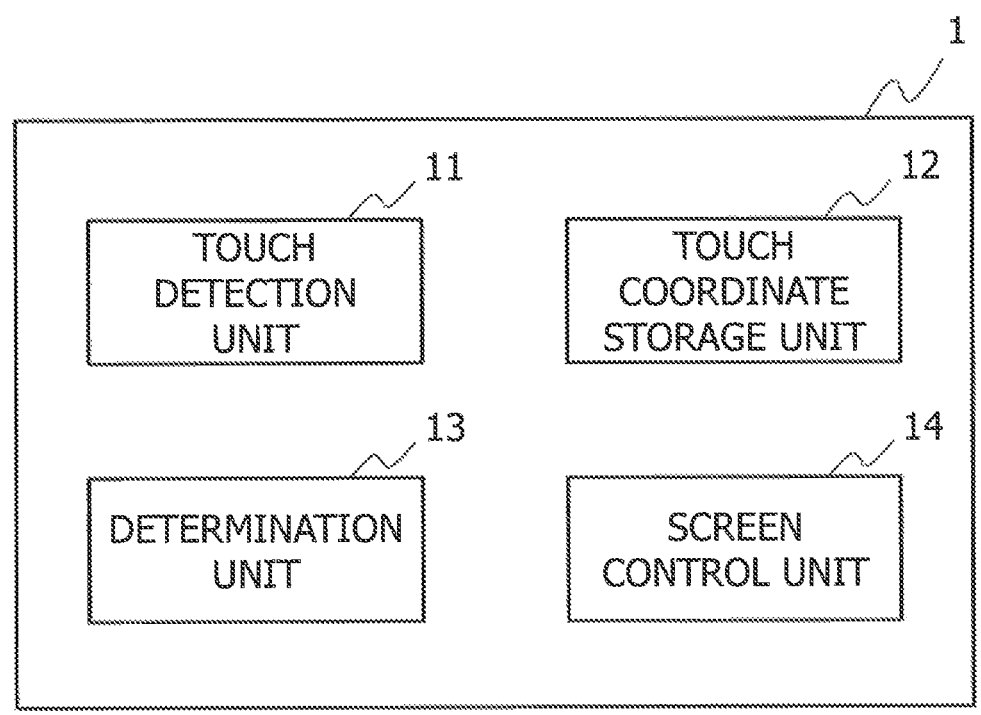
FIG. 3 is a diagram illustrating example functional blocks of the portable tablet terminal.

FIG. 3 is a diagram illustrating example functional blocks of the portable tablet terminal 1. The portable tablet terminal 1 includes, as functional blocks, a touch detection unit 11, a touch coordinate storage unit 12, a determination unit 13, and a screen control unit 14. These functional blocks are implemented by the CPU 101 executing the user touch detection program stored in the ROM 102A or the RAM 102B. However, this is not restrictive, and these functional blocks may be implemented by hardware on FPGA or the like, for example.

The touch detection unit 11 receives touch coordinates on the touch panel 103, input from the touch panel 103, and notifies the determination unit 13 of the same. The touch panel 103 scans the sensor at predetermined intervals, for example, and in the case where a capacitance change is detected, acquires the coordinates of the capacitance change, and outputs the same as the touch coordinates to the touch detection unit 11. That is, touch coordinates are input to the touch detection unit 11 at predetermined intervals from the touch panel 103 while a touch on the touch panel 103 is being detected. The predetermined interval is 10 milliseconds to 100 milliseconds, for example. If, as a result of determination by the determination unit 13, the coordinates are the touch position of a user operation, the touch detection unit 11 notifies an application corresponding to the active program image of the coordinates, for example.

The determination unit 13 determines whether a touch on the touch panel 103 is caused by a user operation or not. More specifically, when touch coordinates on the touch panel 103 are received from the touch detection unit 11, the determination unit 13 instructs the screen control unit 14 to move the active program image by a predetermined vector. Then, when the touch coordinates on the touch panel 103 are input from the touch detection unit 11, the determination unit 13 determines presence/absence of coordinates that move following the movement of the program image, and determines that such coordinates are the position of a user operation. The touch detection unit 11 is notified of the touch coordinates by a user operation.

The screen control unit 14 receives the instruction from the determination unit 13, generates a screen where the active program image has been moved by a predetermined vector, and outputs the screen to the display 104. The predetermined vector is 1 cm in −X direction in FIG. 1B, for example. However, the predetermined vector is not restricted to be such.

FIG. 4 is a diagram illustrating an example of a list of touch coordinates. The touch coordinate storage unit 12 stores touch coordinates on the touch panel 103, input from the touch detection unit 11. The touch coordinate storage unit 12 is created in the storage area in the RAM 102B, for example.

The list of touch coordinates stores a touch number, which is an identification number assigned to each touch coordinate, and each touch coordinate, for example. The touch numbers are assigned in the ascending order of X coordinate, for example. However, this is not restrictive, and the touch numbers may be assigned in the descending order of X coordinate, ascending order of Y coordinate or descending order thereof, for example.

For example, the touch coordinates on the touch panel 103 that are input first from the touch detection unit 11 are recorded as a list of touch coordinates 1 in the touch coordinate storage unit 12. Also, the touch coordinates that are detected first after the active program image has been moved by a predetermined vector or after a predetermined time has elapsed are recorded as a list of touch coordinates 2 in the touch coordinate storage unit 12. For example, in the case where a plurality of waterdrops are attached to the touch panel 103, if the timing of scanning of the touch panel 103 occurs between movement of the program image and the next touch by the finger of the user, the touch coordinates of the waterdrops are detected while there is no touch by the finger of the user. Accordingly, by taking the touch coordinates that are first detected after movement of the program image, after a predetermined time has elapsed, as those for the list of touch coordinates 2, the touch of the finger of the user after the movement of the program image may be more reliably detected. The elapsed predetermined time is 100 milliseconds to 500 milliseconds, for example.

The list of touch coordinates 1 and the list of touch coordinates 2 are recorded by the determination unit 13, for example, and are refreshed every time the determination process is performed by the determination unit 13.

Figure 5:
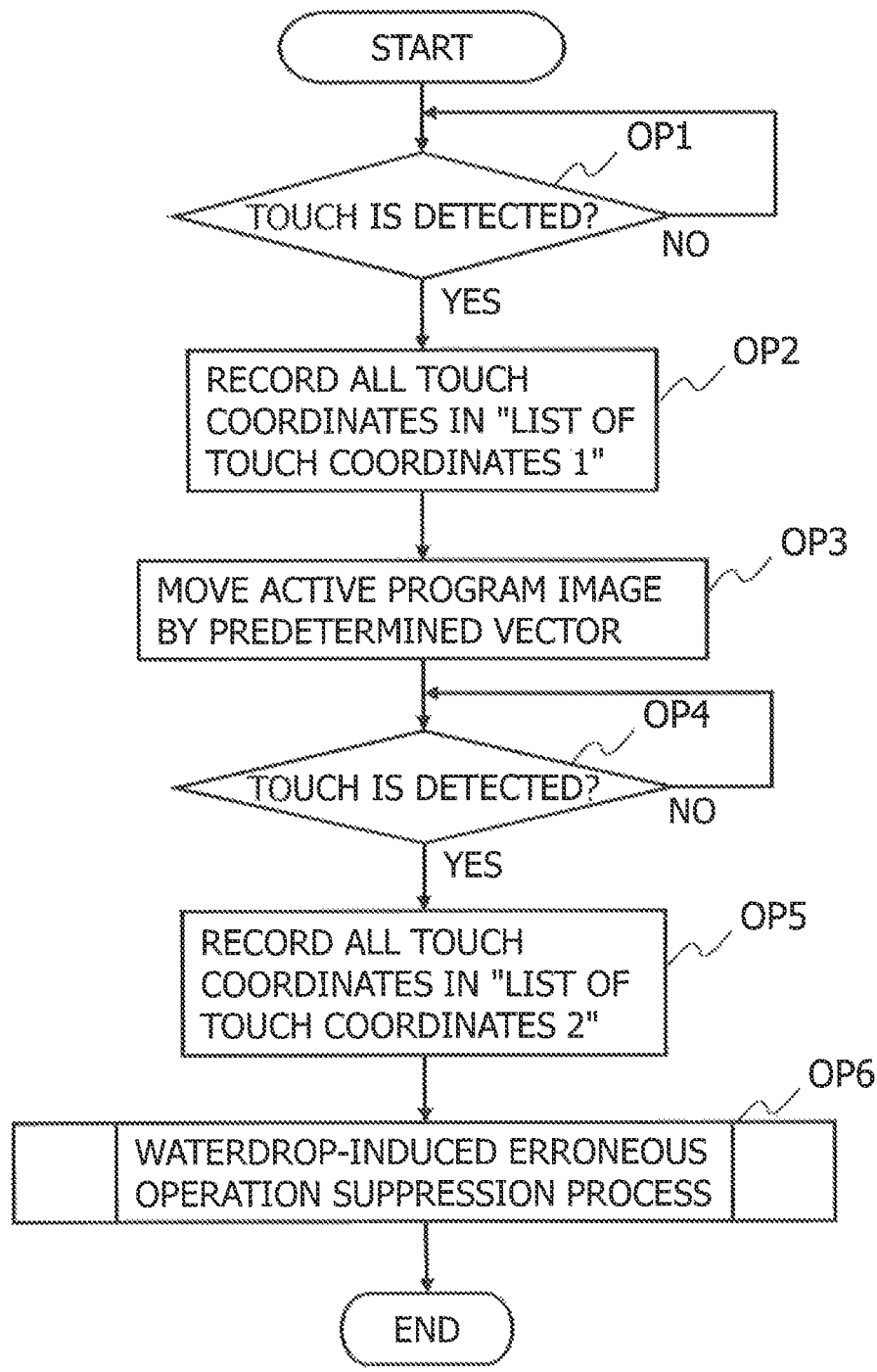
FIG. 5 is an example of a flow chart of a process of a determination unit.

FIG. 5 is an example of a flow chart of a process of the determination unit 13. The flow chart illustrated in FIG. 5 is, for example, started by the activation of the portable tablet terminal 1, and is repeatedly performed while the portable tablet terminal 1 is in operation.

In OP1, the determination unit 13 waits for input of touch coordinates from the touch detection unit 11. When a touch on the touch panel 103 is detected (OP1: YES), that is, when the determination unit 13 receives input of touch coordinates from the touch detection unit 11, the process proceeds to OP2.

In OP2, the determination unit 13 records all the touch coordinates which have been input, in the touch coordinate storage unit 12 as the list of touch coordinates 1.

In OP3, the determination unit 13 instructs the screen control unit 14 to move the active program image by a predetermined vector. The screen control unit 14 generates a screen where the active program image has been moved by a predetermined vector, and outputs the same to the display 104.

In OP4, the determination unit 13 waits for input of touch coordinates from the touch detection unit 11. When a touch on the touch panel 103 is detected (OP4: YES), that is, when the determination unit 13 receives input of touch coordinates from the touch detection unit 11, the process proceeds to OP5.

Additionally, the touch coordinates are input according to the timing of scanning of the sensor of the touch panel 103. Also, the determination unit 13 may shift to the state of waiting for input of touch coordinates in OP4, after a predetermined time has elapsed from the end of the process of OP3.

In OP5, the determination unit 13 records all the touch coordinates which have been input from the touch detection unit 11, in the touch coordinate storage unit 12 as the list of touch coordinates 2.

In OP6, the determination unit 13 performs a waterdrop-induced erroneous operation suppression process, which is for suppressing an erroneous operation due to attachment of a waterdrop. Details of the waterdrop-induced erroneous operation suppression process will be given later.

FIG. 6 is an example of a flow chart of the waterdrop-induced erroneous operation suppression process. The flow chart illustrated in FIG. 6 is started when the list of touch coordinates 1 and the list of touch coordinates 2 are recorded in the touch coordinate storage unit 12.

In OP11, the determination unit 13 acquires the movement amount (vector quantity) of each set of touch coordinates before and after the movement of the program image, based on the list of touch coordinates 1 and the list of touch coordinates 2.

In OP12, the determination unit 13 determines whether there are touch coordinates that match the movement amount (vector quantity) of the program image or not. Additionally, at this time, there may be provided a tolerance range of the movement amount (vector quantity) of the program image+α.

In the case where touch coordinates that match the movement amount (vector quantity) of the program image exist (OP12: YES), the touch coordinates are determined to be the touch operation of the user, and the process proceeds to OP13. In the case where there are no touch coordinates that match the movement amount (vector quantity) of the program image (OP12: NO), it is determined that there are no touch coordinates that can be identified as the touch operation of the user, and the waterdrop-induced erroneous operation suppression process illustrated in FIG. 6 and the process illustrated in FIG. 5 are ended.

In OP13, the determination unit 13 notifies the touch detection unit 11 of the touch number of the touch coordinates identified as the touch operation of the user. The touch detection unit 11 notifies an application corresponding to the active program image of the coordinates of the corresponding touch number, and then, a process corresponding to the touch operation is performed by the application. Additionally, the touch number that the touch detection unit 11 is to be notified of is the touch number in the list of touch coordinates 2. When the process of OP13 is ended, the waterdrop-induced erroneous operation suppression process illustrated in FIG. 6 and the process illustrated in FIG. 5 are ended.

Additionally, although the touch numbers in the list of touch coordinates 1 and the list of touch coordinates 2 are in correspondence with each other in the example illustrated in FIG. 4, the touch numbers in the list of touch coordinates 1 and the list of touch coordinates 2 are not always in correspondence with each other. Accordingly, the determination unit 13 may acquire the movement amount (vector quantity) of coordinates for all the combinations of the touch coordinates in the list of touch coordinates 1 and the list of touch coordinates 2 (OP11), and may assume the combination of touch coordinates that matches the movement amount (vector quantity) of the program image to be the movement of the finger of the user. In this case, the determination unit 13 notifies the touch detection unit 11 of the touch number, in the list of touch coordinates 2, of the combination of touch coordinates matching the movement amount (vector quantity) of the program image.

Additionally, the active program image which has been moved by a predetermined vector may be returned to its original position after the process illustrated in FIG. 6 has been completed. Also, the movement amount (vector quantity) of the active program image may be different every time the processes illustrated in FIGS. 5 and 6 are performed. For example, in the case of an n-th process (n: a positive integer), the movement amount of the active image may be such that the movement amount (vector quantity) at the n−1-th process is offset.

<Effect of First Embodiment>

In the first embodiment, when a touch on the touch panel 103 is detected, the portable tablet terminal 1 moves the active program image by a predetermined vector. The portable tablet terminal 1 acquires the movement amount (vector quantity) of each set of touch coordinates before and after the movement of the program image, determines the touch coordinates that match the movement amount of the program image to be the touch operation of the user, and does not perform processing for other touch coordinates. Thus, even when an unintended touch on the touch panel 103 occurs, such as by a waterdrop, the portable tablet terminal 1 may reliably identify a touch operation of the user, and may eliminate the unintended touch. Accordingly, the portable tablet terminal 1 may suppress an erroneous operation due to attachment of a waterdrop or the like on the touch panel 103.

According to the information processing apparatus, the information processing method, and the information processing program disclosed, an erroneous operation due to an unintended touch on a touch panel may be suppressed.

<Others>

In the first embodiment, in the case where a touch on the touch panel 103 is detected, the active program image is moved by a predetermined vector. However, this is not restrictive, and the entire display screen of the display 104 may be moved by a predetermined vector, or a part of the active program image may be moved by a predetermined vector, for example.

In the first embodiment, in the waterdrop-induced erroneous operation suppression process, the determination unit 13 acquires the movement amount (vector quantity) of each set of touch coordinates based on the list of touch coordinates 1 and the list of touch coordinates 2, and determines whether or not there is a set of touch coordinates whose movement amount matches the movement amount (vector quantity) of the program image. The waterdrop-induced erroneous operation suppression process is not restricted to such, and, for example, the determination unit 13 may determine, based on the list of touch coordinates 1 and the list of touch coordinates 2, whether or not there is a set of touch coordinates that have been moved, and the set of touch coordinates that have been moved may be assumed to be the touch operation of the user.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a display;
a touch panel; and
a processor, wherein the processor
moves a part or all of an active program image by a predetermined first vector and displays the part or all of the active program image on the display when a first touch on the touch panel is detected,
determines, when a second touch on the touch panel is detected after a predetermined time elapsed after the part or all of the active program image moves, whether a movement amount of a second vector from the first touch to the second touch matches the movement amount of the first vector, wherein the movement amount is a vector quantity including a predetermined direction and a predetermined movement distance,
when the movement amount of the second vector matches the movement amount of the first vector, identifies the second touch as a user operation and notifies an application corresponding to the active program image of the coordinates of the second touch as the coordinates of the user operation, and
when the movement amount of the second vector does not match the movement amount of the first vector, identifies the second touch as an unintended touch and does not notify an application corresponding to the active program image of the coordinates of the second touch.

2. An information processing method of an information processing apparatus including a processor, a touch panel, and a display, the method, executed by the processor, comprising:
moving a part or all of an active program image by a predetermined first vector and displaying the part of all of the active program image on the display when a first touch on the touch panel is detected;
determining, when a second touch on the touch panel is detected after a predetermined time elapsed after the part or all of the active program image moves, whether a movement amount of a second vector from the first touch to the second touch matches the movement amount of the first vector, wherein the movement amount is a vector quantity including a predetermined direction and a predetermined movement distance;
when the movement amount of the second vector matches the movement amount of the first vector, identifying the second touch as a user operation and notifying an application corresponding to the active program image of the coordinates of the second touch as the coordinates of the user operation; and
when the movement amount of the second vector does not match the movement amount of the first vector, identifying the second touch as an unintended touch and not notifying an application corresponding to the active program image of the coordinates of the second touch.

3. A non-transitory computer-readable recording medium recording an information processing program for causing a processor of an information processing apparatus including the processor, a touch panel and a display to:
move a part or all of an active program image by a predetermined first vector and display the part or all of the active program image on the display when a first touch on the touch panel is detected;
determine when a second touch on the touch panel is detected after a predetermined time elapsed after the part or all of the active program image moves, whether a movement amount of a second vector from the first touch to the second touch matches the movement amount of the first vector, wherein the movement amount is a vector quantity including a predetermined direction and a predetermined movement distance;

when the movement amount of the second vector matches the movement amount of the first vector, identify the second touch as a user operation and notify an application corresponding to the active program image of the coordinates of the second touch as the coordinates of the user operation; and when the movement amount of the second vector does not match the movement amount of the first vector, identify the second touch as an unintended touch and not notify an application corresponding to the active program image of the coordinates of the second touch.

* * * * *